United States Patent
Yuse et al.

(10) Patent No.: US 10,501,145 B2
(45) Date of Patent: Dec. 10, 2019

(54) MASTER CYLINDER DEVICE FOR REAR WHEEL BRAKE OF MOTORCYCLE AND ARRANGEMENT METHOD OF MASTER CYLINDER DEVICE FOR REAR WHEEL BRAKE OF MOTORCYCLE

(71) Applicant: SUZUKI MOTOR CORPORATION, Shizuoka-Ken (JP)

(72) Inventors: Tatsuya Yuse, Hamamatsu (JP); Kuninari Kurabayashi, Hamamatsu (JP)

(73) Assignee: SUZUKI MOTOR CORPORATION (JP)

( * ) Notice: Subject to any disclaimer, the term of this patent is extended or adjusted under 35 U.S.C. 154(b) by 0 days.

(21) Appl. No.: 15/863,430

(22) Filed: Jan. 5, 2018

(65) Prior Publication Data
US 2018/0215442 A1   Aug. 2, 2018

(30) Foreign Application Priority Data
Feb. 1, 2017   (JP) .................................. 2017-016825

(51) Int. Cl.
*B62L 3/04*   (2006.01)

(52) U.S. Cl.
CPC ...................................... *B62L 3/04* (2013.01)

(58) Field of Classification Search
CPC ........ B60T 11/22; B60T 11/16; B60T 11/106; B60T 17/04; B60T 15/043; B60T 13/36; B60T 13/365; B60T 13/403; B60T 7/06; B62L 3/04; B62J 25/00; B62K 19/38; B62K 23/08; B62K 25/283; B62K 25/286

USPC ..... 303/48, 115.6, 344, 82; 188/344, 181 A, 188/72.4, 24.14; 180/219, 227; 280/124.128
See application file for complete search history.

(56) References Cited

U.S. PATENT DOCUMENTS

| | | | | |
|---|---|---|---|---|
| 3,013,393 | A | * | 12/1961 | Erickson ................. B60T 11/22 60/588 |
| 4,492,284 | A | * | 1/1985 | Hayashi .................. B60T 8/261 123/198 C |
| 4,910,962 | A | * | 3/1990 | Keane ....................... B60T 7/04 60/589 |
| 6,336,328 | B1 | * | 1/2002 | Inami ...................... B60T 11/16 60/585 |
| 2003/0213666 | A1 | * | 11/2003 | Masuda .................. B60T 11/22 188/344 |

(Continued)

FOREIGN PATENT DOCUMENTS

JP   2003291799 A   10/2003

*Primary Examiner* — Robert A. Siconolfi
*Assistant Examiner* — San M Aung
(74) *Attorney, Agent, or Firm* — Barnes & Thornburg LLP

(57) ABSTRACT

A master cylinder device 38 for a rear wheel brake of a motorcycle includes a master cylinder 35 and a reserve tank 36. The cylinder 35 discharges brake fluid when a piston thereof is pushed by depression of a brake pedal 40. The reserve tank is integrally formed with a cylinder body 35a of the master cylinder 35. A contour 60 of a rear wheel side of the master cylinder device 38 extending continuously from a bottom end α of the master cylinder body 35a in a vertical direction to an upper end β of the reserve tank 36 in the vertical direction is linearly formed to be oriented obliquely rearward and upward in a vehicle side view.

4 Claims, 3 Drawing Sheets

(56) References Cited

U.S. PATENT DOCUMENTS

2010/0243359 A1* 9/2010 Cheng ..................... B60T 7/06
  180/219

* cited by examiner

MASTER CYLINDER DEVICE FOR REAR WHEEL BRAKE OF MOTORCYCLE AND ARRANGEMENT METHOD OF MASTER CYLINDER DEVICE FOR REAR WHEEL BRAKE OF MOTORCYCLE

CROSS-REFERENCE TO RELATED APPLICATIONS

This application claims the benefit of priority of Japanese Patent Application No. 2017-016825, filed Feb. 1, 2017, the entire contents of which are incorporated herein by reference.

BACKGROUND OF THE INVENTION

Field of the Invention

Embodiments of the present invention relate to a structure of a master cylinder device included in a rear wheel brake of a motorcycle.

Description of the Related Art

Conventionally, there is a known technique in which a reserve tank of a rear wheel brake of a motorcycle is integrally formed with a master cylinder (e.g., Japanese Unexamined Patent Application Publication No. 2003-291799).

In a conventional motorcycle, a connection structure of a reserve tank integrated with a master cylinder is stepped to protrude obliquely rearward, the rear wheel side, and upward with respect to the master cylinder body, the master cylinder standing upright in the vertical direction.

There is a possibility that incoming materials such as pebbles and sticks may be caught in the gap between the protruding reserve tank and the upper surface of the swing arm swinging up and down so as to damage the reserve tank.

SUMMARY OF THE INVENTION

In view of the above-described problem, an object of the present invention is to provide a master cylinder device for a rear wheel brake of a motorcycle, in which the master cylinder is integrated with a reserve tank, to suppress biting or tangling of incoming materials by the master cylinder.

A master cylinder device for a rear wheel brake of a motorcycle according to the present embodiment includes a master cylinder, and a reserve tank. The master cylinder discharges brake fluid when a piston thereof is pushed by depression of a brake pedal. The reserve tank is integrally formed with a cylinder body of the master cylinder. A contour of a rear wheel side of the master cylinder device extending continuously from a bottom end $\alpha$ of the master cylinder body in a vertical direction to an upper end of the reserve tank in the vertical direction is linearly formed to be oriented obliquely rearward and upward in a vehicle side view.

The present invention provides a master cylinder device for a rear wheel brake of a motorcycle and an arrangement method of a master cylinder device for a rear wheel brake of a motorcycle, in each of which the master cylinder is integrated with a reserve tank, to reduce incoming materials tangled or bitten by the master cylinder.

The nature and further characteristic features of the present invention will be described hereinafter in the following descriptions made with reference to the accompanying drawings, and the other advantages effects and functions of the present invention will be also made clear hereinafter.

DETAILED DESCRIPTION

Hereinbelow, embodiments of the present invention will be described by referring to the accompanying drawings.

Figure 1:
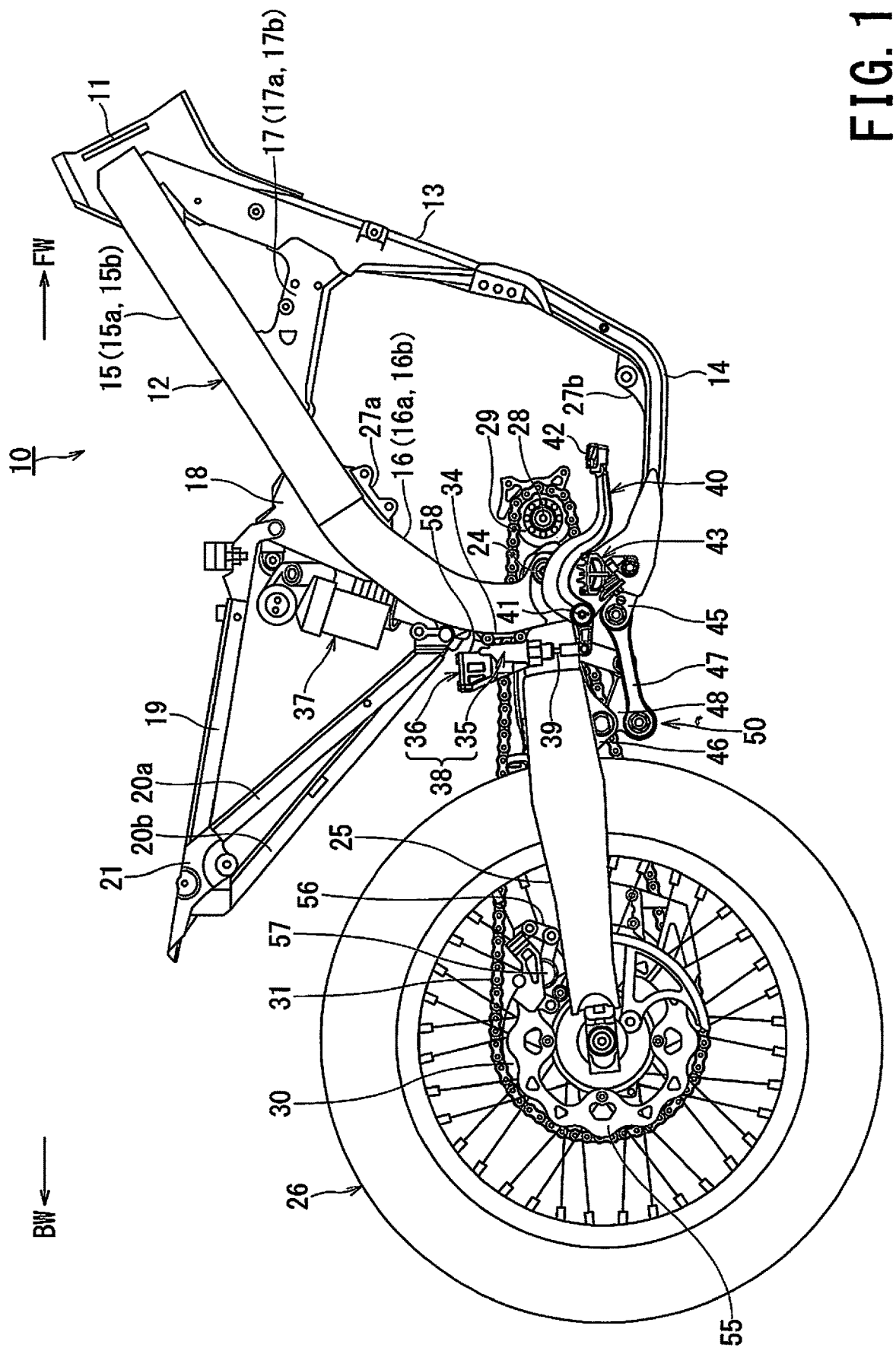
FIG. 1 is a right side view illustrating a state in which a master cylinder device for a rear wheel brake of a motorcycle according to the present embodiment is mounted on a vehicle-body frame.

FIG. 1 is a right side view illustrating a vehicle-body frame 10 of a motorcycle.

In FIG. 1, the front side of the vehicle-body frame 10 is denoted by the reference sign FW, and the vehicle rear side is denoted by the reference sign BW.

The vehicle-body frame 10 includes a head pipe 11, a right-and-left pair of main frames 12, a single down frame 13, and a right-and-left pair of lower frames 14.

The pair of main frames 12 expand to the right and the left, respectively, from the head pipe 11 at the front end of the vehicle-body frame 10, and extend obliquely rearward and downward. The right main frame 12 is composed of a right tank frame 15a and a right body frame 16a, and the left main frame 12 is composed of a left tank frame 15b and a left body frame 16b (hereinafter, the right-and-left pair of tank frames 15a and 15b are collectively denoted as the tank frames 15, and the right-and-left pair of body frames 16a and 16b are collectively denoted as the body frames 16). The tank frames 15 extend obliquely rearward and downward, and a non-illustrated fuel tank is placed on the tank frames 15. The body frames 16 are curved from the rear end portions of the respective tank frames 15 (i.e., from the middle of the main frames 12), and extend below the vehicle body.

The down frame 13 extends downward from the lower side of the head pipe 11.

The pair of lower frames 14 are curved from both sides of the lower end portion of the down frame 13, and extend rearward in the horizontal direction. The respective rear end portions of the pair of lower frames 14 are connected to the lower ends of right and left body frames 16 respectively, which constitute the front structure of the vehicle-body frame 10.

The pair of tank frames 15a and 15b are connected to the down frame 13 by a right-and-left pair of reinforcing members 17a and 17b, respectively (hereinafter, the right-and-left pair of reinforcing members 17a and 17b are collectively denoted as the reinforcing members 17). As a result, the rear side around the head pipe 11 is formed into a triangular reinforcing structure in a vehicle side view, and the rigidity is enhanced.

A pair of mounting brackets 18 is fixed to the upper portion of the curved back portion side of the main frames 12.

An upper end of a rear cushion unit 37 and respective front end portions of a right-and-left pair of seat rails 19 are mounted on the mounting bracket 18. The pair of seat rails 19 extend obliquely rearward and upward, and are reinforced by right-and-left pair of support frames 20a and 20b which are sheet pillars. The support frames 20a and 20b extend obliquely rearward and upward from the rear side in the middle of the curved portion of the main frames 12. The respective rear ends of the support frames 20a and 20b are connected to the respective rear ends of the pair of seat rails 19 by the end bracket 21 to constitute the rear structure of the vehicle-body frame 10.

The body frames 16 of the main frames 12 serve for a center frame or a pivot frame, and a pivot shaft 24 is provided on the lower front side of the body frames 16. A swing arm 25 is swingably provided around the pivot shaft 24. The swing arm 25 extends from the pivot shaft 24 toward the rear side of the vehicle body, and includes a right-and-left pair of arms. A rear wheel 26 is mounted on the rear end portions of respective arms of the swing arm 25.

Further, a non-illustrated engine is mounted on the vehicle-body frame 10 by plural suspension brackets 27a and 27b. A drive sprocket 29 is provided on an output shaft 28 of the engine. A drive chain 31 is provided to transmit the power of the engine and to drive the rear wheel 26 to rotate. The drive chain 31 is hung around the drive sprocket 29 on one side and a driven sprocket 30 on the opposite side. The driven sprocket 30 is fixed to the axle of the rear wheel 26. The output shaft 28 of the engine is positioned in front of the pivot shaft 24 which supports the swing arm 25.

A mounting bracket 34 is provided at the rear portion in the middle of the curved portion of the right body frame 16a of the right main frame 12, and a master cylinder 35 vertically oriented is mounted on the mounting bracket 34 with a fixing member such as a fastening bolt. A reserve tank 36 is disposed on the master cylinder 35, the reserve tank 36 project rearward from the rear side of the master cylinder 35. The reserve tank 36 is integrally formed with the master cylinder 35 or be joined to the master cylinder 35. The master cylinder 35 and the reserve tank 36 constitute a master cylinder device 38 for a rear wheel brake of a motorcycle (hereinafter, the master cylinder device 38 is referred to as "the integrally-formed cylinder device 38").

A piston rod 39 is energized by a spring from the master cylinder 35 of the integrally-formed cylinder device 38 so as to protrude downward. The lower end of the piston rod 39 is pin-coupled to the rear end portion of an arm-shaped brake pedal 40. The brake pedal 40 is pivotally supported by a brake pivot shaft 41 which is provided at the lower portion of the right body frame 16a. When a rider pushes down a pedal part 42 provided at the front end of the brake pedal 40 with the foot, the brake pedal 40 rotates clockwise as shown in FIG. 1 and is pushed in. By this rotation, the piston rod 39 is pushed up and the master cylinder 35 is operated.

The rear cushion unit 37 is connected with the vehicle-body frame 10 with a cushion link mechanism 50. The cushion link mechanism 50 is composed of a frame-side link bracket 45 provided at the lower end portion of the body frames 16 of the main frames 12, a swing-arm-side link bracket 46 provided on the lower side of the front portion of the swing arm 25, a cushion link lever 48, and a connecting link rod 47. The cushion link lever 48 is substantially in the form of a triangle, and the rear end portion of the cushion link lever 48 is supported by the swing-arm-side link bracket 46 such that the cushion link lever 48 can freely swing up and down. The connecting link rod 47 connects the middle portion of the cushion link lever 48 to the frame-side link bracket 45.

The lower end portion of the rear cushion unit 37 is connected to the front end portion of the cushion link lever 48 of the cushion link mechanism 50. The upper end of the rear cushion unit 37 is connected to the mounting bracket 18 which is provided at the upper rear portion of the curved portion of the main frames 12. The swing arm 25 is supported by the cushion link mechanism 50 and the rear cushion unit 37 so as to be stably swingable around the pivot shaft 24.

Next, a description will be given of a rear wheel brake mechanism on which the integrally-formed cylinder device 38 is mounted.

On the axle of the rear wheel 26, a brake disk 55 is fixed via a hub drum.

On the brake disc 55, a brake caliper 57 fixed to the swing arm 25 via a bracket 56 is provided to sandwich the brake disc 55.

On the right body frame 16a, a brake pivot shaft 41 is mounted near the footrest 43 and is positioned above and behind the footrest 43.

On the brake pivot shaft 41, the arm-shaped brake pedal 40 is pivotally supported at the rear side of the intermediate portion. The brake pedal 40 curves upward bypassing the footrest 43, and extends forward avoiding interfering with the footrest 43 at the time of braking. At the front end of the brake pedal 40, a pedal member 42 is disposed. The rear end portion of the brake pedal 40 is pin-connected to the lower end portion of the piston rod 39 and is linked to the piston rod 39.

When the pedal member 42 is depressed, the brake pedal 40 rotates clockwise to push the piston rod 39 upward and moves a non-illustrated piston in the master cylinder 35 upward into a fluid-filled chamber. The upward movement of the piston makes the brake fluid discharged from a discharge port 58 which is connected to the front side surface of the upper portion of the fluid-filled chamber in the state of being slightly inclined forward from the vertical direction.

The discharge port 58 and the brake caliper 57 are connected to each other by a non-illustrated brake tube. Brake pads in the brake caliper 57 are pushed out to the brake disc 55 by the brake fluid which is pressured by the upward motion of the piston in the master cylinder 35, and thereby the brake pads sandwich the brake disc 55. The brake pads are pressed against the brake disc 55 to generate friction, and thereby brake the rear wheel 26.

Next, the more detail describes of the integrally-formed cylinder device 38 will be referred.

Figure 2:
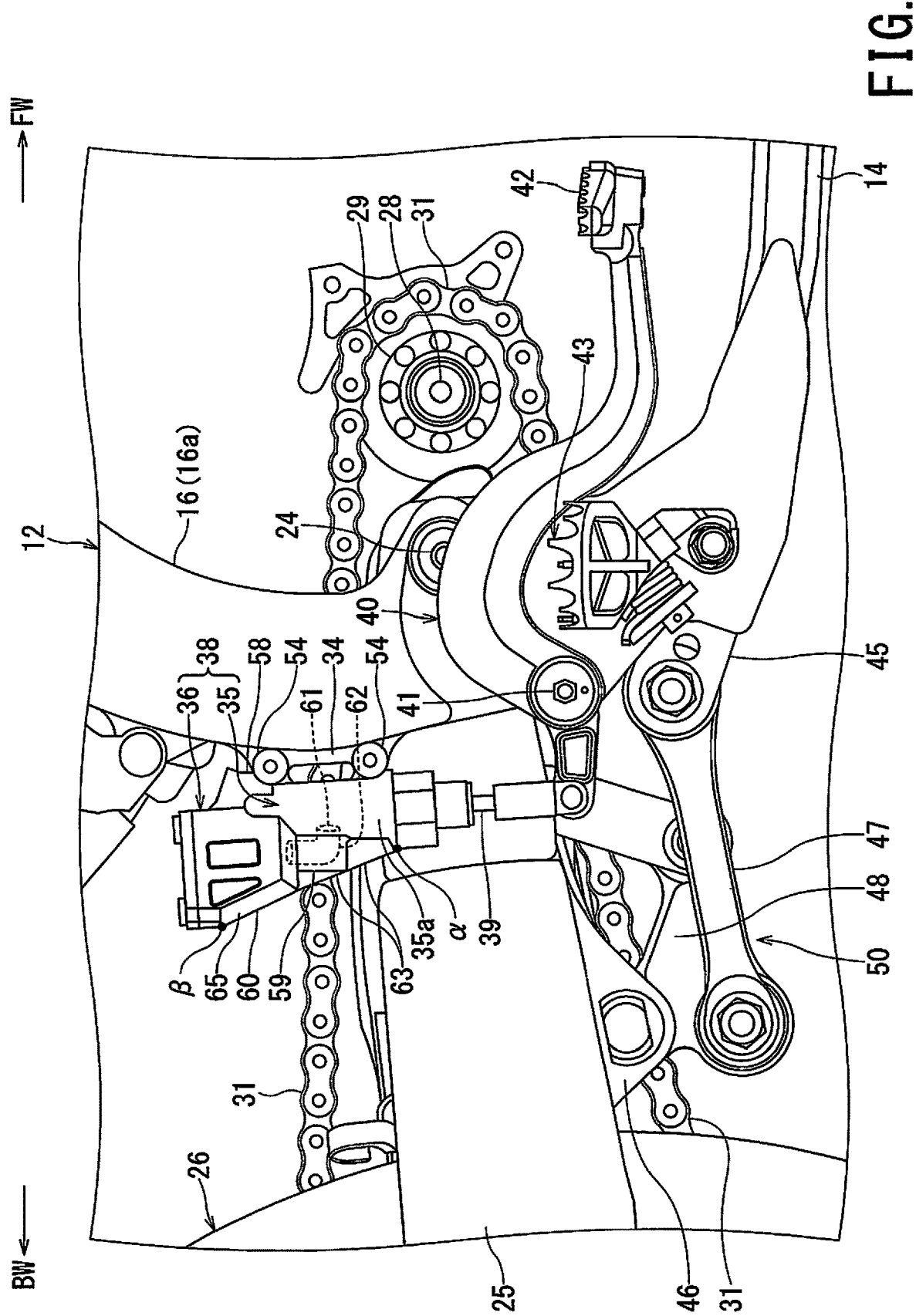
FIG. 2 is an enlarged right side view illustrating the periphery of the master cylinder device for a rear wheel brake of a motorcycle according to the present embodiment.

FIG. 2 is an enlarged right side view of the periphery of the integrally-formed cylinder device 38 according to the present embodiment.

The mounting bracket 34 of the integrally-formed cylinder device 38 is fixed to the rear side of the lower end portion of the right side body frame 16a with a bolt 54 such that the longitudinal direction of cylinder body 35a is in the vertical direction. A cylinder body 35a of the master cylinder 35 is mounted on the mounting bracket 34 with screws.

On the upper rear side of the master cylinder 35, the reserve tank 36 is integrally formed with the cylinder body 35a and communicates with (i.e., be spatially connected with) the cylinder body 35a.

In other words, to the cylinder body 35a, a communication passage forming member 59 is integrally formed, and a communication passage 62 is formed inside the communication passage forming member 59 connected to a replenishing port 61 provided on the rear side surface (i.e., rear-wheel side surface) of the fluid-filled chamber and is extending upward.

The upper end of the communication passage 62 communicates with the fuel supply port at the bottom portion of the reserve tank 36. The communication passage forming member 59 and the reserve tank 36 are integrally molded.

Further, the reserve tank 36, the cylinder body 35*a*, and the communication passage forming member 59 are integrally molded and formed.

The fluid storage chamber inside the reserve tank 36 communicates with the fluid-filled chamber inside the master cylinder 35 via the communication passage 62, and stores the brake fluid.

The communication passage 62 which is integrally formed on the upper portion of the cylinder body 35*a* to extend along the side surface of the cylinder body 35*a* communicates with (i.e., spatially connected with) a replenishing port 61 which opens on the side surface of the cylinder body 35*a*.

In other words, the communication passage forming member 59 is bent almost perpendicularly and is connected to both of the reserve tank 36 and the cylinder body 35*a* of the master cylinder 35 respectively.

The communication passage forming member 59 and the reserve tank 36 integrally formed therewith are disposed to protrude from the rear side surface of the cylinder body 35*a* due to positional relationship with the discharge port 58 which is connected to the front side surface of the cylinder body 35*a*.

In a conventional master cylinder which is a type of being integrally formed with a reserve tank, discontinuous steps are formed by the contour of rear side of the cylinder body 35*a*, the bottom surface of the reserve tank 36, and the contour of rear side of the reserve tank 36.

Thus, in such a conventional master cylinder, there is a possibility that incoming materials such as fly stones and rods are tangled into the gap between the bottom surface of the reserve tank 36 and the upper surface of the swing arm 25 swinging up and down. In this case, and the reserve tank 36 is damaged.

Hence, in the integrally-formed cylinder device 38 according to the present embodiment, a contour of the rear wheel side of the integrally-formed the master cylinder device 38 is formed to be inclined obliquely rearward and upward and extend substantially linearly upward in the vertical direction. The above-described "rear end surface of the integrally formed cylinder device 38" is a continuous region from the lower end α of the cylinder body 35*a* in the vertical direction to the upper end β of the reserve tank 36 in the vertical direction in a vehicle side view as shown in FIG. 1, and is hereinafter abbreviated as the rear-contour 60.

The term "lower end α in the vertical direction of the cylinder body 35*a*" may include the vicinity of the lower end α of the cylinder body 35*a* in the vertical direction. In other words, as shown in FIG. 2, this term also includes a case where the lower end of the substantially linear rear-contour 60 (i.e., rear end surface of the integrally-formed cylinder device 38) becomes the lower end of the internal space of the master cylinder 35.

Further, the term "upper end β of the reserve tank 36 in the vertical direction" may include the vicinity of the upper end β of the reserve tank 36 in the vertical direction. In other words, as shown in FIG. 2, this term includes a case where the upper end of the substantially linear rear-contour 60 is equivalent to the height of the middle part of the inner space of the reserve tank 36.

In order to make the rear-contour 60 substantially linear (i.e., straight line or flat), for instance, the integrally-formed cylinder device 38 has a substantially right triangle shape in the state of being mounted on the vehicle-body frame 10 in a vehicle side view and a plate-shaped rib 63 protruding from the cylinder body 35*a* toward the side of the rear wheel 26 is fixed to the cylinder body 35*a* as shown in FIG. 2.

The rib 63 fills the space around the step formed by the rear side surface of the communication passage forming member 59 and the bottom surface of the reserve tank 36 such that the step is buried to be flat.

The rib 63 also fills the space around the step formed by the rear side surface of the cylinder body 35*a* and the bottom surface of the communication passage forming member 59 such that the step is buried to be flat.

As a result, the linear oblique side of the ribs 63 forms the rear-contour 60.

Further, the mechanical reinforcement function of the rib 63 also contributes to reduction in redundant thickness of the cylinder body 35*a*.

The rear-contour 60 is formed to be inclined at an angle of 40 degrees or more and less than 90 degrees with respect to the upper side or the bottom side of the reserve tank 36. Note that the bottom side of the reserve tank 36 is in parallel with the horizontal direction.

In other words, the integrally-formed cylinder device 38 is configured such that the holding angle between the rear-contour 60 and the swing arm 25 becomes an acute angle close to an obtuse angle (i.e., an acute angle which is 40 degrees or more and less than 90 degrees).

By setting the inclination of the rear-contour 60 to such an angle, it is possible to prevent incoming materials from being caught between the rear-contour 60 and the upper surface of the swing arm 25.

This angle is more preferably an acute angle closer to an obtuse angle, e.g., 60 degrees or more and less than 80 degrees.

Figure 3:
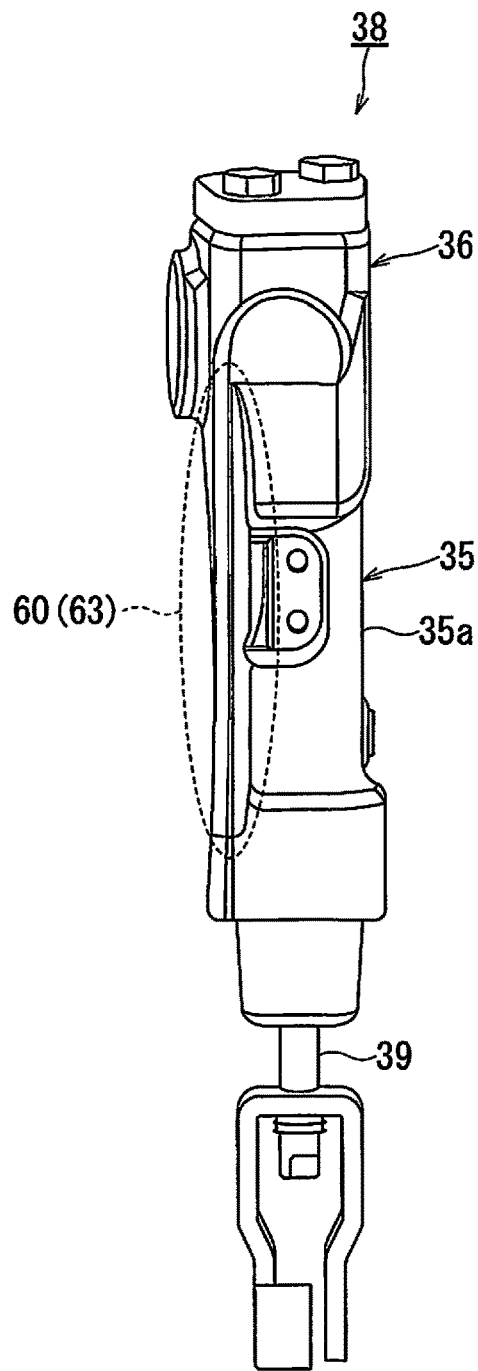
FIG. 3 is a rear view illustrating the master cylinder device for a rear wheel brake of a motorcycle according to the present embodiment.

FIG. 3 is a rear view of the integrally-formed cylinder device 38 according to the present embodiment.

The inner side in the vehicle width direction, i.e., the left-hand side of the rider getting on the motorcycle is indicated as LW, and the right-hand side of the rider is indicated as RW.

In order to more effectively prevent incoming materials from tangled, the rib 63 is preferably provided along the inner edge in the vehicle width direction (i.e., the wheel side in the vehicle width direction) on the bottom surface of the reserve tank 36 as shown in FIG. 3.

Returning to FIG. 2, the description of the structure around the reserve tank 36 will be continued.

Preferably, the shape of the reserve tank 36 is an inverted trapezoid in which the base side is shorter in length than the upper side in the vertical direction, by inclining the rear surface 65 of the reserve tank 36 rearward and upward.

The rear surface 65 forms a part of the linear shape of the rear-contour 60.

By making the reserve tank 36 into an inverted trapezoidal shape, the tank capacity can be increased.

Also in this case, the upper end of the rib 63 can be lowered to the bottom surface of the reserve tank 36.

The right angled corner at the side surface and the bottom surface of the reserve tank 36 disappears from the lower end of the reserve tank 36 by cutting the rear surface 65 into askew-cut shape. Thus, even when the rib 63 is not provided, the possibility of incoming materials being bitten by the bottom surface of the reserve tank 36 is reduced.

According to the integrally-formed cylinder device 38 of the above-described embodiments, it is possible to suppress tangling of incoming materials between the swing arm 25 and the integrally-formed cylinder device 38.

In addition, it is also possible to prevent the contact of the rider's foot with the protruding corner portions of the reserve tank 36 and the communication passage forming member 59, which happened sometimes.

While certain embodiments have been described, these embodiments have been presented by way of example only, and are not intended to limit the scope of the inventions.

The above-described embodiments may be embodied in various forms; furthermore, various omissions, substitutions, changes, and combinations of the above-described embodiments may be made without departing from the spirit of the inventions.

The accompanying claims and their equivalents are intended to cover such forms or modifications as would fall within the scope and spirit of the inventions.

What is claimed is:

1. A master cylinder device for a rear wheel brake of a motorcycle comprising:
    a master cylinder that discharges brake fluid when a piston thereof is pushed by depression of a brake pedal; and
    a reserve tank integrally formed with a cylinder body of the master cylinder,
    wherein a contour of a rear wheel side of the master cylinder device extending continuously from a bottom end of the master cylinder body in a vertical direction to an upper end of the reserve tank in the vertical direction is linearly formed to be oriented obliquely rearward and upward in a vehicle side view, wherein a linear shape of the contour of the rear wheel side of the master cylinder device is formed by a plate-shaped rib protruding from the cylinder body toward the rear wheel side; and the rib is provided along an inner edge of a bottom surface of the reserve tank in a vehicle width direction.

2. The master cylinder device according to claim 1, wherein the reserve tank is formed into an inverted trapezoidal shape in which a base side is shorter in length than an upper side in the vertical direction in the vehicle side view and wherein a rear surface of the reserve tank is formed to be inclined rearward and upward.

3. A master cylinder device for a rear wheel brake of a motorcycle comprising:
    a master cylinder that discharges brake fluid when a piston thereof is pushed by depression of a brake pedal; and
    a reserve tank integrally formed with a cylinder body of the master cylinder,
    wherein a contour of a rear wheel side of the master cylinder device extending continuously from a bottom end of the master cylinder body in a vertical direction to an upper end of the reserve tank in the vertical direction is linearly formed to be oriented obliquely rearward and upward in a vehicle side view, and
    wherein the contour of the rear wheel side of the master cylinder device has an inclination of 40 degrees or more and less than 90 degrees with respect to a bottom surface of the reserve tank.

4. An arrangement method of a master cylinder device for a rear wheel brake of a motorcycle, wherein the master cylinder device according to claim 1 is arranged in such a manner that the linearly formed contour of the rear wheel side of the master cylinder device is inclined at an angle of 40 degrees or more and less than 90 degrees from a horizontal direction in a vehicle side view.

* * * * *